No. 846,571. PATENTED MAR. 12, 1907.
Z. H. KEVORKIAN.
ELASTIC FLUID TURBINE.
APPLICATION FILED FEB. 2, 1906.
5 SHEETS—SHEET 1.
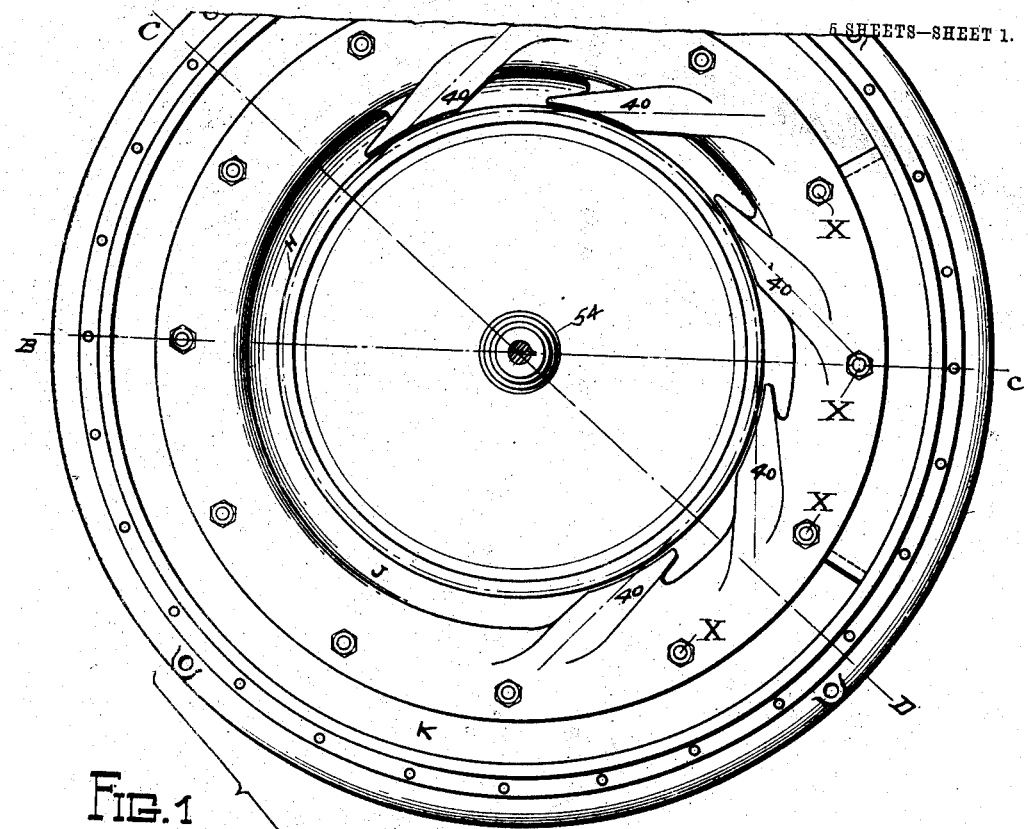
Fig. 1
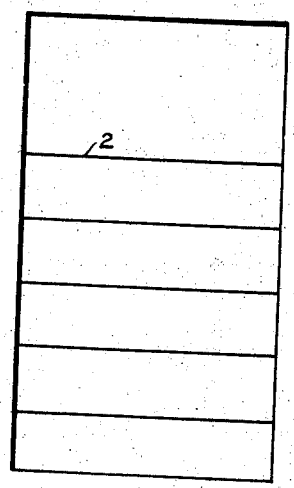
WITNESSES
Albert H. Moore
Lewis A. Swigart
INVENTOR
Z. H. Kevorkian

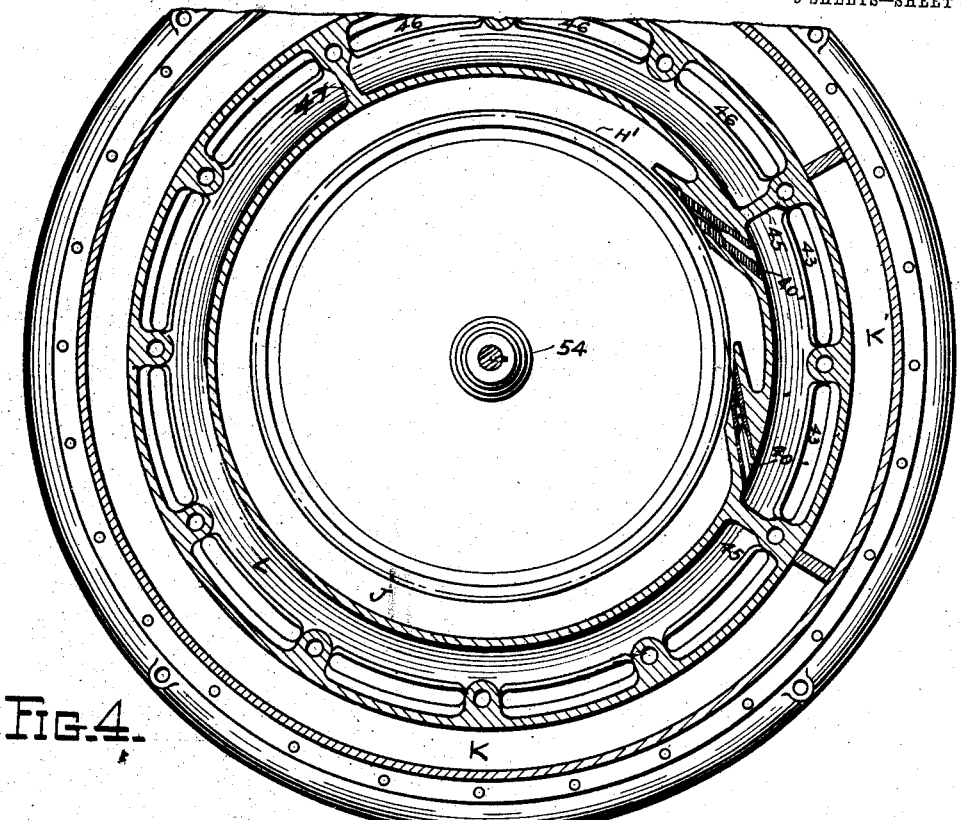
Fig. 4.
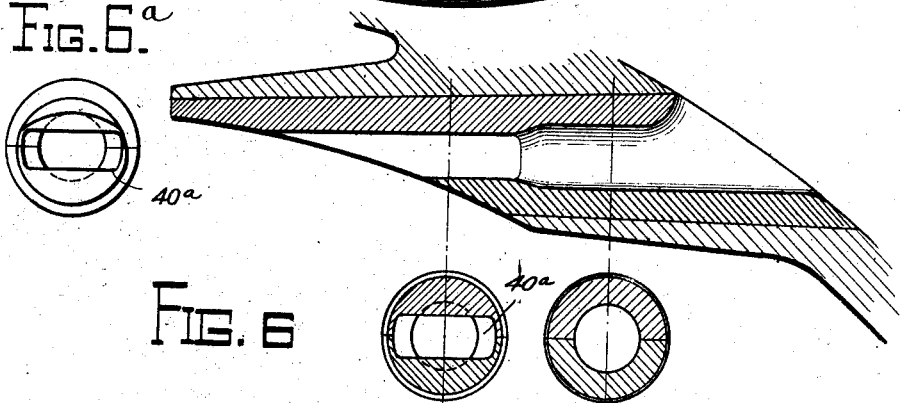
Fig. 6.ᵃ
Fig. 6.
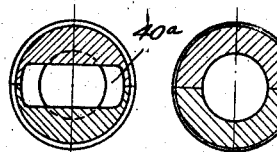
Fig. 6.ᵇ  Fig. 6.ᶜ

No. 846,571. PATENTED MAR. 12, 1907.
Z. H. KEVORKIAN.
ELASTIC FLUID TURBINE.
APPLICATION FILED FEB. 2, 1906.
5 SHEETS—SHEET 5.
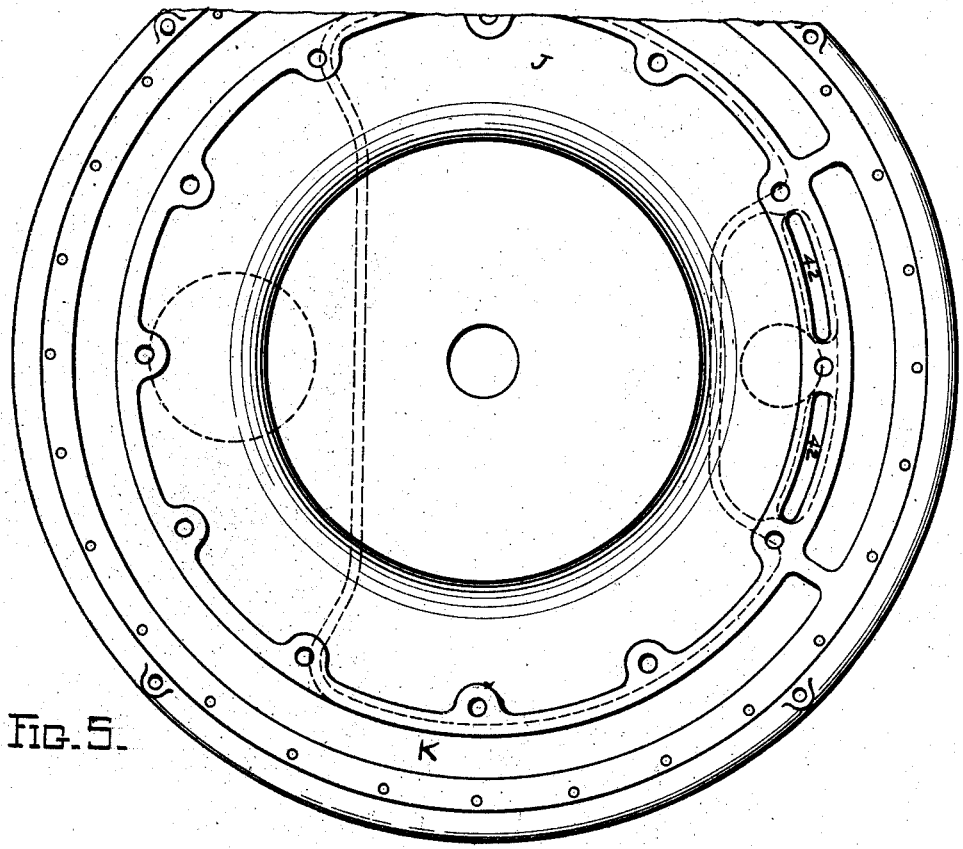
FIG. 5.
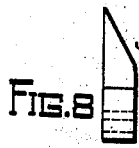
FIG. 8.
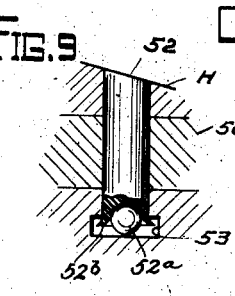
FIG. 9.
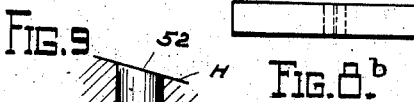
FIG. 8.ᵃ
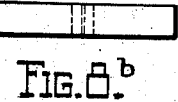
FIG. 8.ᵇ
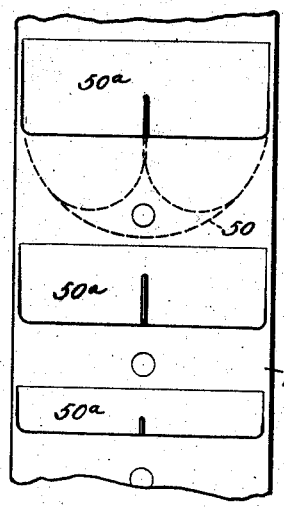
FIG. 7.
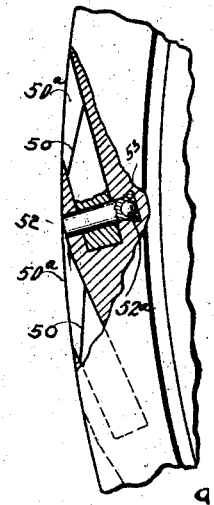
FIG. 7.ᵃ
WITNESSES
Albert H. Moore
Lewis R. Turpart
INVENTOR
Z. H. Kevorkian

UNITED STATES PATENT OFFICE.

ZAREH H. KEVORKIAN, OF PITTSBURG, PENNSYLVANIA.

ELASTIC-FLUID TURBINE.

No. 846,571.

Specification of Letters Patent.

Patented March 12, 1907.

Application filed February 2, 1906. Serial No. 299,133.

*To all whom it may concern:*

Be it known that I, ZAREH H. KEVORKIAN, a citizen of the United States, residing at Pittsburg, in the county of Allegheny and State of Pennsylvania, have invented certain new and useful Improvements in Elastic-Fluid Turbines, of which the following is a full, clear, and exact description, reference being had to the accompanying drawings, forming a part of this specification.

This invention relates to multiple-stage elastic-fluid turbines adapted to either horizontal or vertical construction, but preferably the latter, which is shown, for economy of floor-space.

The invention has for its object to provide in a turbine of this type an organization of parts whereby simplicity, compactness, practicability of operation, and economy in normal cost, operation, and floor-space are obtained.

The various scopes of invention are attended to in the claims.

The general type of turbine consists of a base-plate forming part of the exhaust-space, a plurality of assembled and superposed annular chambers for different stages of steam-pressure, rotary turbine-wheels therein, bolts holding said chambers together, an annular shell surrounding said chambers and secured to said base-plate, a cover for the chambers attached to said shell, ports and nozzles for admitting steam to one of the central turbine-wheels, nozzles for leading the exhaust-steam from said central turbine-wheel, both to the next succeeding wheel above and below said central wheel, and other ports for leading the steam successively to higher and lower wheels.

I will now describe the construction by reference to the drawings.

Figure 2:
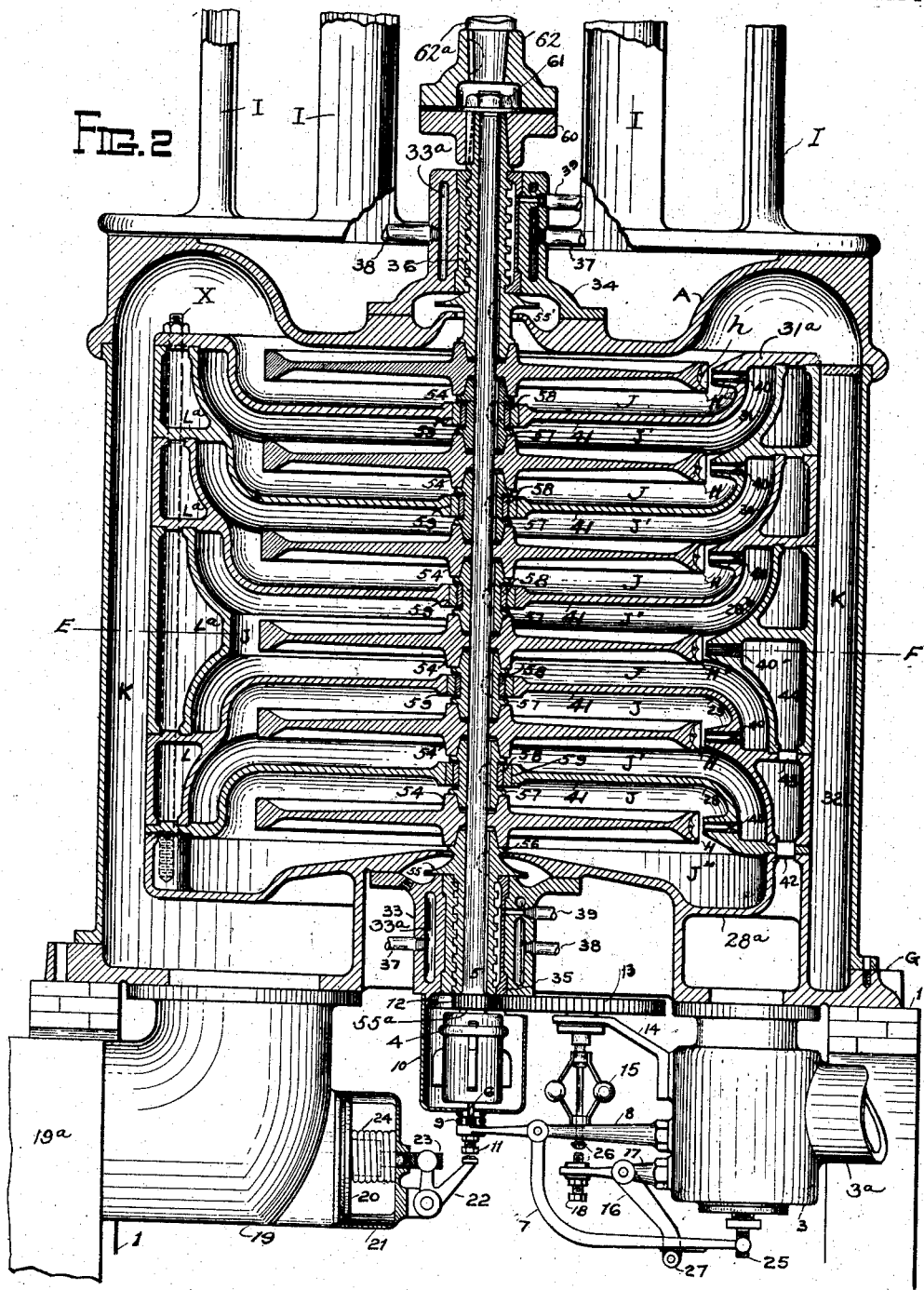
Figure 3:
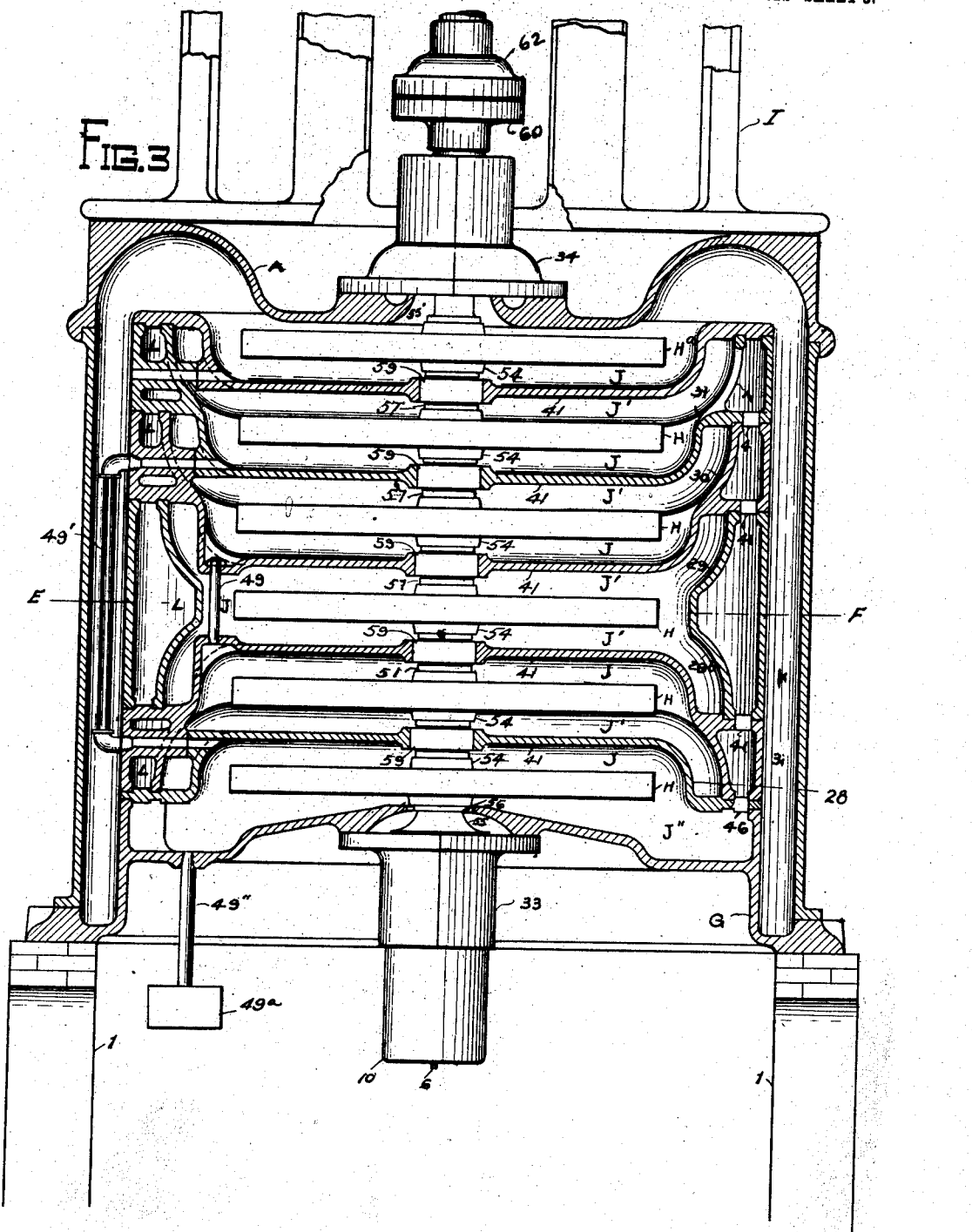

Figure 1 is a plan of the assembled chambers, the cover of the turbine being omitted. Fig. 2 is a vertical sectional view on the line B C, showing especially the passages and ports, as far as they can be seen in a single figure, and the inlet and exhaust pipes. Fig. 3 is a vertical section taken on the line C D, showing especially the passages and ports for the transfer of the steam from the lower end of the turbine to near the upper end. Fig. 4 is a horizontal section on the line E F seen in Figs. 2 and 3. Fig. 5 is a plan of the base-plate seen in Figs. 2 and 3, showing especially the location of the inlet and exhaust ports. Fig. 6 is an enlarged horizontal section of one of the nozzles shown in Fig. 4. Figs. $6^a$, $6^b$, and $6^c$ are additional views of this nozzle, Fig. $6^a$ being an end view of the main portion of the nozzle. Figs. $6^b$ and $6^c$ are sections of the main portion of the nozzle at the lines indicated. Fig. 7 is a part of one of the rotary turbine-wheels on an enlarged scale and looking toward its center. Fig. $7^a$ is a side view of the latter figure partly in section. Fig. 8 shows one of the details of the wheel separated from the latter. Figs. $8^a$ and $8^b$ are different views of the same detail. Fig. 9 is an enlarged partial section of a portion of Fig. $7^a$.

I will first describe the construction and operation of the means for insuring practically constant speed under variation of load.

At G is the base-plate, represented as mounted upon a foundation 1, provided with arches, one of which is for the stairs 2, leading from the floor of the building to below the turbine, where the regulating apparatus can be attended to. Another arch is for the steam-pipe $3^a$, another for the exhaust-pipe 19, while a fourth may be used for any desired purpose.

3 represents the valve-chest. The valve itself is not shown, but the stem thereof is at 25. The valve-chest is supported under the base-plate G. At the lower end of the turbine-shaft 5 is a centrifugal shaft-governor whose movable stem is at 6, bearing against one of the arms of a bent lever 7, pivoted on a bracket 8, extending from the steam-chest 3.

At 9 is a spring for keeping the lever 7 in contact with the stem 6.

A cover 10 is provided for the governor.

11 is an adjusting-screw for affording adjustment to the point of contact between the lever 7 and the stem 6.

An emergency-governor 15, suspended from a bracket 14, is actuated by a pinion 12 on the shaft 5 through the medium of the large speed-reducing gear-wheel 13. In case the centrifugal shaft-governor breaks down and the turbine races in consequence the emergency or safety governor 15 will act as a substitute. Other advantages follow from using both governors. For example, the balls of the governor may be adjusted to cause this governor to assist the governor 4 by acting jointly therewith. The governor 15 is for actuating the bent lever 16, fulcrumed on the bracket 17 and having a roller 27, bearing on the under side of the lever 7, which is pivoted to the stem 25. The end of the lever 16, acted upon by the governor 15, is provided with a screw 18 in the path of the governor-stem 26. This screw 18 may be employed for adjusting the action of the governor 15 upon the lever 16.

The valve 20 is for regulating the quantity of air from the natural atmosphere admitted to the exhaust-pipe 19 for the purpose of increasing the back pressure of the steam in the turbine. The advantage of this arrangement is to quicken the action of the governors 4 and 15. When the speed varies, not only does the quantity of steam admitted vary by the action of the governors, but the back pressure at the exhaust also varies. The valve 20 is provided with a stem 23, a retractile spring 24, and an operating bent lever 22, which is pivoted to the frame 21. Normally the lever 22 is pressed against the adjusting-nut 11 by the action of the spring 24. When the lever 7 is actuated by one or both of the governors 4 and 15, the valve 20 is operated. The condenser is shown at $19^a$, joining the pipe 19.

The turbine proper consists of a plurality of dished sections—namely, a double-dished middle section 29 with an air-jacket L, two superposed duplicate dished sections 30 and 31, a like but inverted dished section $28^b$, being a duplicate of the section 30 or 31 and located under the section 29, the sections $28^b$, 30, and 31 also having air-jackets $L^a$, a dished section $31^a$, acting as a cover for the top section 31, a dished section 28 below the section $28^b$, and bolts X for tying the sections together rigidly. The whole body of sections is supported upon the top of a dished cover $28^a$, projecting upward from the base-plate G. The top section $31^a$ contains in its concavity a wheel $H^a$, provided with buckets $h$. There is also a rotary turbine-wheel H in each one of the other sections above and below the central section 29, while the central section 29 has a rotary bucket-wheel H'. The wheel $H^a$ is for utilizing the residual steam-pressure when a condenser is employed, and therefore the provision of this wheel converts the turbine into either a condensing or non-condensing steam-turbine, as will be understood from further detail explanations. A shell 32 surrounds the sections heretofore named at a sufficient distance to leave steam-passages K and K' and is fastened by stud-bolts to the base-plate G. An annularly-dished cover A is supported on top of the shell 32. The chamber K' is a divided-off portion of the chamber K for the purpose of insulating the hot steam from the exhaust. The valve-chest 3 communicates directly and permanently with a port 42 in the section 28 and then with a port 43 in the section $28^b$, then with nozzles 40' in the section 29, which is hollow to form a steam-chamber containing the bucket-wheel H'. Then the steam divides, one portion passing downward to nozzles 40 in the section $28^b$, then to the next wheel H opposite the last-named nozzles, then through the nozzles 40 in the section 28, then to the wheel H opposite the last-named nozzles, then into the section $28^a$, and then to the upper wheel $H^a$ in the following manner, where the same steam-pressure prevails, there being only two bucket-wheels below the wheel H', while there are three bucket-wheels above the wheel H'. After the steam has exhausted from the lowest wheel H it passes through a port 46 in the section 28, then through a port 46 in the section $28^b$, then through a port 46 in the section 30, then through a port 46 in the section 31, then through a port M, also in the section 31, where the steam passes through the nozzles in the section $31^a$, thereby joining the steam which passed from the wheel H' to the wheels above the latter, the two supplies of steam meeting just before they reach the nozzles 40 in the section $31^a$. Then the steam exhausts through the chamber K and the exhaust-pipe 19.

Above and below the bucket-wheel H' are steam-spaces J'', and the next lower wheel H is between the steam-spaces J and J', and similarly there are steam-spaces above and below each of the wheels.

41 represents the walls, there being one between every two steam-chambers. These walls are portions of the dished sections hereinbefore mentioned.

The top wheel $H^a$ is in the steam-chamber J, bounded above by the cover A and below by the highest wall 41. The lowest wheel is in a chamber formed by the section $28^a$ and the lowest wall 41.

Because of successively-decreasing steam-pressures, both as the steam travels to the upper part of the turbine and as it travels to the lower part of the turbine, the number of nozzles for successive wheels above and below the wheel H' increases. This feature is illustrated in Figs. 1 and 4. There are only two nozzles shown in the latter figure for the wheel H', while there are five nozzles shown in Fig. 1 for the uppermost wheel H.

Fig. 6 shows an enlarged section of the nozzles. They have a circular opening at the admission end. This opening changes to a section of practically a rectangular shape at the exit end, as seen at $40^a$ in Figs. $6^a$ and $6^b$. The rectangular exit is slightly larger in area than the circular inlet, whereby a desired velocity of the motive fluid while discharging may be obtained.

I will now describe the construction of the buckets.

Semicylindrical slots $50^a$ are formed obliquely in the periphery of each wheel. (See, for example, wheel H in Fig. 7.) Blocks 50, having deflecting-surfaces $50^b$ and $50^c$ meeting at a point $50^d$, are fixed in the respective slots $50^a$ by pins 52, which pass through the material of the wheel and through holes 50ᵉ in said blocks. The means for holding the pins in, in each instance, is as follows: The hole for any pin 52 has an enlarged counterbore at the inner end containing a ball 52ᵃ. The inner end of the pin 52 is upset, forming a flange 52ᵇ, extending into the counterbore 53. The pin 52 has a countersunk end for receiving said ball. The flange 52ᵇ is produced primarily by forcibly driving in the pin 52 for upsetting the end of the pin, the countersunk opening in the pin being originally smaller than the ball.

The step-journal 55 rests against the shoulder 55ᵃ at the end of the shaft 5, said journal having a tapered end to fit the hub 54 of the lowest bucket-wheel H. The hub 54 rests against a flange 56, formed on the journal 55, which is keyed on the shaft 5, which carries doubly-conical spacing-collars between the bucket-wheels, which have conical sockets for receiving the ends of said collars.

58 are split rings of antifriction-metal packing fitted to the collars 57 and placed in split rings 59 and snugly fitted to the center bores of the walls 41, thus preventing leakage of steam from one stage to another. The rings 59 are made of any well-known material which will expand more than the material having the bores in which said rings fit, thereby producing tighter joints at a high temperature.

At the upper end of the turbine is another step-journal 55' similar to the journal 55. The upper journal carries at its end a coupling 60, which is held in place by a nut 61 on the shaft 5. Besides this the nut 61 holds together the rotating parts as a unit. The tightening of the nut 61 acts, finally, against the shoulder 55ᵃ, formed on the shaft 5.

The shaft 5, the collars 57, and the hubs 54 should be constructed of such materials as prevent any elongation of the shaft relatively to the said collars and hubs at increased temperatures.

62 is the part of the coupling which is attached to the shaft 62ᵃ of any machine which is to be driven by the turbine. I represents the supports for said machine.

The base-plate G and top cover A carry bearing-housings 33 and 34, respectively, and are of similar construction, being made in halves to facilitate the convenient replacing of the split step-bearings 35 and 36. Each bearing-housing is provided with an annular space 33ᵃ, forming a jacket around the entire bearing for the circulation of cold water around the same, the pipe connections being at 37 and 38. The pipes 39 are for lubrication.

Pipes 49 49' are for the disposal of condensed steam from upper steam-chambers to corresponding lower steam-chambers where the pressures are the same. Thus, for example, the pipe 49 delivers any condensed steam from the steam-chamber next above the section 29 to the steam-chamber next below the section 29. The nozzles 40 in the section 28 carry the water, together with the steam, into the chamber J". The pipe 49" serves to carry the water to a trap 49ᵃ from the chamber J".

I claim as my invention—

1. In a turbine, the combination of a plurality of assembled and superposed chambers for different stages of steam-pressure, a rotary turbine-wheel in each chamber, means for delivering steam to one of the central wheels, and means for delivering the exhaust-steam from said central wheel to the wheels both above and below said central wheels.

2. In a turbine, the combination of a succession of chambers for different stages of steam-pressure, a rotary turbine-wheel in each chamber, means for delivering steam to the central wheel, means for delivering steam from said central wheel successively to the wheels on each side thereof, and means for conducting the exhaust-steam from the last wheel on one side of said central wheel and for delivering it to the last wheel on the other side of said central wheel.

3. In a turbine, the combination of a succession of chambers for different stages of steam-pressure, a rotary turbine-wheel in each chamber, means for delivering steam to the central wheel, an extra chamber with its turbine-wheel, and means for delivering steam to said extra turbine-wheel from the extreme turbine-wheels first mentioned.

4. In a turbine, the combination of a base-plate, a plurality of assembled and contiguous annular chambers for different stages of steam-pressure, rotary turbine-wheels therein, bolts holding said chambers together, an annular shell surrounding said chambers and secured to said base-plate, a cover for the chambers attached to said shell, ports and nozzles for admitting steam to one of the central turbine-wheels, an annular air-jacket surrounding each chamber, and means for conducting the steam from the central turbine-wheel successively to those wheels which are above and below the same.

5. In a turbine, the combination of a plurality of assembled and contiguous annular chambers for different stages of steam-pressure, rotary turbine-wheels therein, ports and nozzles for admitting steam to the central turbine-wheel, means for conducting the steam from the central wheel to the wheels above and below the same, and pipes for the escape of the condensed steam from the upper chambers to those respective lower chambers where the same pressures prevail.

6. In a turbine the combination of an annular section 29, having an air-jacket surrounding the same, and having a central opening, a turbine-wheel in said opening, dished sections with surrounding air-jackets on each side of said section 29, a turbine-wheel in each dished section, bolts holding all sections together, a base-plate, a shell surrounding all sections and secured to said base-plate, a cover on said shell, inlet and exhaust pipes for the steam to enter said sections, a conical socket on each side of each wheel, doubly conical collars, fitting in the sockets and passing through said sections in a loose but steam-tight manner, a shaft passing through said sockets and collars, and means for pressing the collars into said sockets.

7. In a turbine, the combination of a wheel having a semicylindrical depression oblique to the peripheral surface thereof, a steam-dividing block in said depression, having surfaces curving from the center of the entrance of said depression to the respective sides of the depression, and a pin in said wheel for holding said block in said depression.

8. In a turbine, the combination of a wheel having a semicylindrical depression oblique to the peripheral surface thereof, a steam-dividing block in said depression having surfaces curving from the center of the entrance of said depression to the respective sides of the depression, and a pin in said wheel for holding said block in said depression, said wheel having a hole with an enlarged bore at the inner end, and said pin having a flange which protrudes into said bore.

9. In a turbine, the combination of turbine-wheels, hubs therefor, having sockets, a shaft, a shoulder thereon at the lower end, a step-journal having a tapered end for fitting into the socket of the lowest wheel, a flange on the journal, the hub of the lowest wheel resting on said flange, doubly conical spacing-collars keyed on said shaft between said hubs and fitting in the respective sockets, turbine-sections through which pass said collars, packing-rings between said collars and the material of said sections.

10. In a turbine, the combination of rotary turbine-wheels, collars, a shaft passing through said collars and wheels, and being of less linear expansion by heat than the collars and wheels, and means for clamping the collars and wheels together, the collars being keyed to and the wheels being loose on said shaft before being clamped.

In testimony whereof I affix my signature in the presence of two witnesses.

ZAREH H. KEVORKIAN.

Witnesses:
ALBERT H. MOORE,
HARRY SUSSER.